US008663868B2

(12) United States Patent
Smith et al.

(10) Patent No.: US 8,663,868 B2
(45) Date of Patent: Mar. 4, 2014

(54) MICROPOROUS PVDF FILMS

(75) Inventors: Samantha D. Smith, Minneapolis, MN (US); Gene H. Shipman, Cottage Grove, MN (US); Robert M. Floyd, Maplewood, MN (US); Harold Todd Freemyer, Woodbury, MN (US); Steven J. Hamrock, Stillwater, MN (US); Michael A. Yandrasits, Hastings, MN (US); David G. S. Walton, Honolulu, HI (US)

(73) Assignee: 3M Innovative Properties Company, Saint Paul, MN (US)

( * ) Notice: Subject to any disclaimer, the term of this patent is extended or adjusted under 35 U.S.C. 154(b) by 814 days.

(21) Appl. No.: 12/014,435

(22) Filed: Jan. 15, 2008

(65) Prior Publication Data

US 2008/0113242 A1 May 15, 2008

Related U.S. Application Data

(63) Continuation of application No. 10/661,908, filed on Sep. 12, 2003, now Pat. No. 7,338,692.

(51) Int. Cl.
*H01M 8/10* (2006.01)
*H01M 2/16* (2006.01)
*B05D 1/14* (2006.01)
*B32B 1/08* (2006.01)
*B01D 65/00* (2006.01)
*B01D 29/00* (2006.01)

(52) U.S. Cl.
USPC ..... 429/492; 429/491; 428/308.8; 428/304.4; 210/500.42

(58) Field of Classification Search
USPC .............. 429/30, 491, 492; 428/304.4, 308.8; 210/500.42
See application file for complete search history.

(56) References Cited

U.S. PATENT DOCUMENTS

| | | | |
|---|---|---|---|
| 4,255,376 A | 3/1981 | Soehngen | |
| 4,539,256 A | 9/1985 | Shipman | |
| 4,726,989 A | 2/1988 | Mrozinski | |
| 5,013,339 A | 5/1991 | Mahoney et al. | |
| 5,022,990 A | 6/1991 | Doi et al. | |
| 5,489,406 A * | 2/1996 | Beck et al. | 264/41 |
| 5,601,769 A * | 2/1997 | Fortuin et al. | 264/135 |
| 5,738,111 A * | 4/1998 | Weimer et al. | 128/849 |
| 5,910,378 A | 6/1999 | Debe et al. | |
| 5,962,544 A | 10/1999 | Waller, Jr. | |
| 5,976,686 A | 11/1999 | Kaytor et al. | |
| 5,985,942 A | 11/1999 | Steck et al. | |
| 6,042,959 A * | 3/2000 | Debe et al. | 429/33 |
| 6,096,213 A * | 8/2000 | Radovanovic et al. | 210/500.36 |
| 6,159,638 A * | 12/2000 | Takatera et al. | 429/309 |
| 6,183,668 B1 | 2/2001 | Debe et al. | |
| 6,254,978 B1 | 7/2001 | Bahar et al. | |
| 7,338,692 B2 | 3/2008 | Smith et al. | |

FOREIGN PATENT DOCUMENTS

| | | |
|---|---|---|
| EP | 0 273 582 | 11/1986 |
| GB | 1 553 050 | 1/1978 |
| JP | 63-161035 | 7/1988 |
| JP | 2002522610 | 2/2000 |
| JP | 2001520443 | 10/2001 |
| WO | WO 98/38029 | 9/1998 |
| WO | WO 99/19924 | 4/1999 |
| WO | WO 00/09597 | 2/2000 |
| WO | WO 02/73582 | 9/2002 |

OTHER PUBLICATIONS

Silberman et al., "The Effect of Pigments on the Crystallization of Properties of Polypropylene," Polymers for Advanced Technologies, John Wiley and Sons, Chichester, GB, vol. 6, No. 10, (Oct. 1, 1995), pp. 643-652, XP000533311.
Mubarak et al, "Effect of Nucleating Agents and Pigments on Crystallization, Morphology, and Mechanical Properties of Polypropylene," Plastics, Rubber and Composites, vol. 29, No. 7, (2000), pp. 307-315, XP009038044.
Schneider et al., "Self-nucleation and enhanced nucleation of polyvinylidene fluoride (α-phase)," Polymer 42, pp. 8787-8798, (2001).
Arora et al., "Battery Separators," *Chem. Rev.*, 2004; 104:4419-4462.
Akelah et al., "9.10 Ionomers," in "Functionalized Polymers and Their Applications," Chapman and Hall, New York, NY, 1990, p. 323.
"Nafion," Wikimedia Foundation, Inc., San Francisco, CA, Feb. 9, 2010, retrieved from the internet at <URL:http://en.wikipedia.org/wiki/Nafion> on Mar. 17, 2010; 6 pgs.
Hamrock et al., "Proton Exchange Membranes for Fuel Cell Applications," *Journal of Macromolecular Science®, Part C: Polymer Reviews*, 2006; 46:219-244.
Japanese Office Action dated Aug. 20, 2010 for Japanese Patent Application No. 2006-526064 (10 pgs).

\* cited by examiner

*Primary Examiner* — Patrick Ryan
*Assistant Examiner* — Ladan Mohaddes
(74) *Attorney, Agent, or Firm* — Gregory D. Allen

(57) ABSTRACT

Shaped microporous articles are produced from polyvinylidene fluoride (PVDF) and nucleating agents using thermally induced phase separation (TIPS) processes. The shaped microporous article is oriented in at least one direction at a stretch ratio of at least approximately 1.1 to 1.0. The shaped article may also comprise a diluent, glyceryl triacetate. The shaped microporous article may also have the micropores filled with a sufficient quantity of ion conducting electrolyte to allow the membrane to function as an ion conductive membrane. The method of making a microporous article comprises the steps of melt blending polyvinylidene fluoride, nucleating agent and glyceryl triacetate; forming a shaped article of the mixture; cooling the shaped article to cause crystallization of the polyvinylidene fluoride and phase separation of the polyvinylidene fluoride and glyceryl triacetate; and stretching the shaped article in at least one direction at a stretch ratio of at least approximately 1.1 to 1.0.

31 Claims, 5 Drawing Sheets

MICROPOROUS PVDF FILMS

CROSS REFERENCE TO RELATED APPLICATIONS

This application is a continuation of application Ser. No. 10/661,908, filed Sep. 12, 2003, now allowed, the disclosure of which is incorporated by reference in its entirely herein.

FIELD OF THE INVENTION

The present invention relates generally to microporous films. In particular, the present invention relates to microporous films formed from polyvinylidene fluoride and methods for making the same utilizing glyceryl triacetate and nucleating agents.

BACKGROUND OF THE INVENTION

Microporous films have a structure that enables fluids and/or gases to flow through. The effective pore size is at least several times the mean free path of the flowing molecules, namely, from several micrometers and down to about 100 angstroms. Sheets of the microporous films are generally opaque, even when made from an originally transparent material, because the surfaces and internal structures scatter visible light.

Microporous films have been utilized in a wide variety of applications, such as filtration of solids, ultrafiltration of colloids, diffusion barriers, and in cloth laminates. Additional applications include: filter cleaning antibiotics, beer, oils, and bacterial broths; analysis of air, microbiological samples, intravenous fluids and vaccines. Microporous films are also utilized in the preparation of surgical dressings, bandages, and in other fluid transmissive medical applications.

Ion conductive membranes (ICMs) are also being developed from microporous films. Ion conductive membranes have found application in membrane electrode assemblies (MEAs) as solid electrolytes. One specific example application of an MEA is a hydrogen/oxygen fuel cell. The ICM is located between the cathode and anode in the MEA, and transports protons from near the catalyst at the hydrogen electrode to the oxygen electrode thereby allowing the current to be drawn from the MEA. The ICMs are particularly advantageous in these applications as they replace acidic liquid electrolytes, such as are used in phosphoric acid fuel cells, which are very hazardous.

Ion conductive membranes are also used in chloroalkali applications to separate brine mixtures and form chlorine gas and sodium hydroxide. The membranes selectively transport the sodium ions across the membrane, while rejecting the chloride ions. ICMs are also useful in the area of diffusion dialysis where, for example, caustic solutions are stripped of their impurities. The membranes are also useful for their operation in vapor permeation and separations due to their ability to transfer polar species at a faster rate than non-polar species.

The microporous films must have sufficient strength to be useful in these various applications. Often this need for increased strength requires increased membrane thickness, which can impair the utility of the membrane by, for example, decreasing the ionic conductance of ion conductive membranes. Membranes that are inherently weak at small thicknesses (for example less than 0.050 mm) must be reinforced with additional materials causing the final product to have increased thickness.

SUMMARY OF THE INVENTION

The present invention is directed to a shaped microporous article of polyvinylidene fluoride, which additionally includes a nucleating agent. The shaped microporous article is oriented in at least one direction at a stretch ratio of at least approximately 1.1 to 1.0. The shaped article may also comprise a compound miscible with polyvinylidene fluoride and in which the polyvinylidene fluoride will dissolve at or above the melting temperature of the polyvinylidene fluoride and will phase separate upon cooling to a temperature at or below the crystallization or phase separation temperature of the polyvinylidene fluoride.

The method of making a microporous article comprises the steps of melt blending polyvinylidene fluoride, nucleating agent and glyceryl triacetate; forming a shaped article of the mixture; cooling the shaped article to cause crystallization of the polyvinylidene fluoride and phase separation of the polyvinylidene fluoride and glyceryl triacetate; and stretching the shaped article in at least one direction at a stretch ratio of at least approximately 1.1 to 1.0.

The present invention is also directed to an ion conductive membrane wherein a shaped article of polyvinylidene fluoride and nucleating agent is oriented in at least one direction at a stretch ratio of at least approximately 1.1 to 1.0 to provide a network of micropores. The shaped article is oriented such that the bubble point pore size is greater than approximately 0.4 microns and the shaped article has a thickness less than approximately 1.5 mils (37.5 microns) and a Gurley less than approximately 10 sec/50 cc. The micropores of the shaped article are filled with a sufficient quantity of ion conducting electrolyte to allow the membrane to function as a ion conductive membrane.

DETAILED DESCRIPTION

Figure 1:
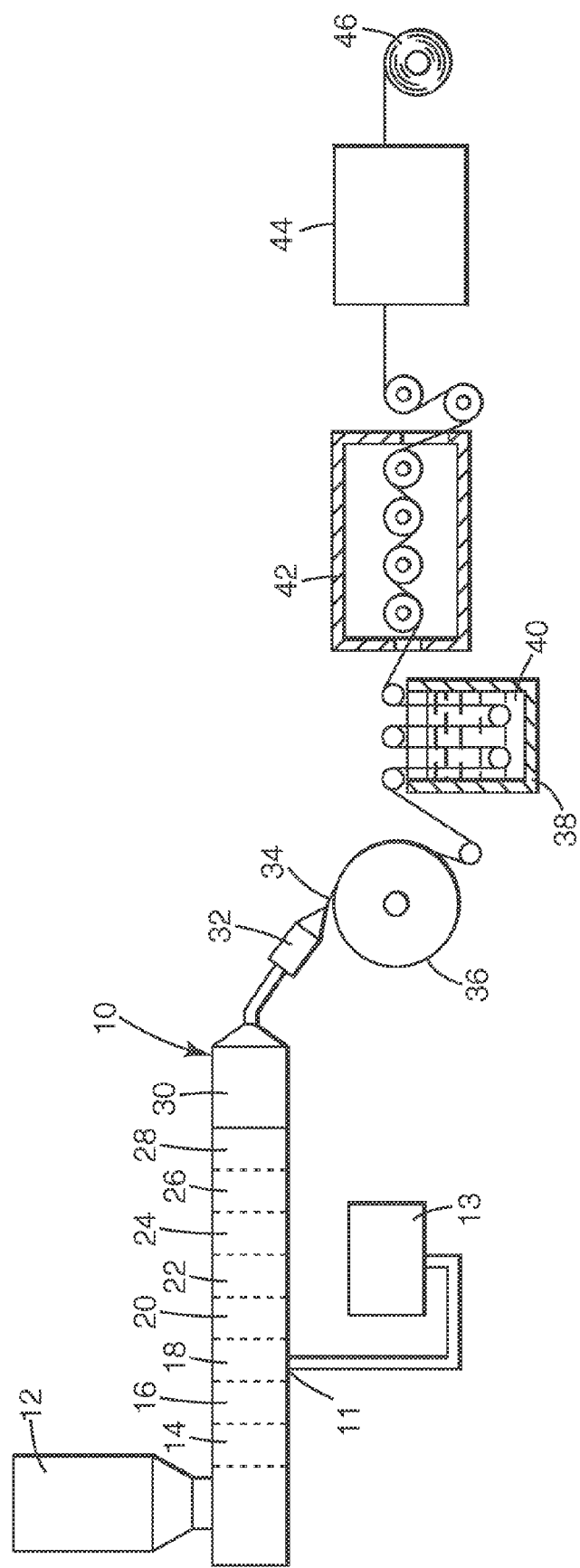
FIG. 1 is a perspective view of an apparatus that may be used to practice the method of and to produce microporous films in accordance with the present invention.

The present invention provides microporous polyvinylidene fluoride (PVDF) films suitable for a variety of applications. The present invention applies the process of Thermally Induced Phase Separation (TIPS) to PVDF with selection of a proper diluent and nucleating agent for the production of microporous films. Glyceryl triacetate is successfully used as diluent for production of microporous films from PVDF. Glyceryl triacetate is readily removed from the microporous films by water and is economically and environmentally advantageous because of the sewerable, nonhazardous by-products. The invention additionally provides several nucleating agents for use in the novel PVDF microporous films. Microporous membranes produced from polyvinylidene fluoride (PVDF) using thermally induced phase separation (TIPS) processes can be customized to have a range of microporous properties, including improved strength, chemical resistance, and reduced thickness in comparison to other conventional membrane materials.

A microporous film for a particular application is made by selecting: a suitable thermoplastic polymer; then matching diluent and nucleating agent to the polymer to achieve the desired properties. If the resulting cast film is of sufficient strength, it is oriented to create the desired microporous characteristics in the film.

Polyvinylidene fluoride (PVDF) is inherently chemical, UV and fire resistant, low protein binding, and electrically insulating. Therefore, application of this thermoplastic polymer to the development of microporous films is desirable. However, much of the previous development of microporous films has focused on other thermoplastics such as polypropylene. Generally, the diluents and nucleating agents for one class of polymer do not readily extend to other classes of polymers.

A process known as Thermally Induced Phase Separation, or TIPS, is used to produce the microporous PVDF films of the present invention. The method generally involves melt blending a thermoplastic polymer or polymer blend with a miscible compound, i.e. a diluent, where the diluent is miscible with the thermoplastic at the melting temperature of the thermoplastic, but phase separates on cooling below the phase separation temperature of the thermoplastic. As used herein, the term "diluent" is meant to encompass both solid and liquid agents. The phase separation between the PVDF and diluent may be either liquid-liquid or liquid-solid. After the film or article is phase separated, it is oriented in least one direction to provide a network of interconnected micropores throughout. Additionally, the miscible compound (i.e. diluent) may be removed either before or after orientating or alternatively, retained in the film to facilitate filling of the pore structure.

Generally, the TIPS process involves a polymer and a diluent which form a single homogenous phase at an elevated temperature. To process a TIPS film, the diluent and polymer are fed into an extruder which heats and mixes the two together to form the homogenous liquid solution. This solution is then either cooled in air or, preferably, cast into a film-like article and cooled upon contact with a casting wheel. During the cooling process for the solid/liquid TIPS constructions, the polymer crystallizes out of the solution to cause the formation of a solid polymer phase and liquid diluent phase. The solid phase consists of spherulites held together by polymer chain tie fibrils. In the case of a liquid-liquid TIPS process, the polymer separates out of the solution to form a second liquid phase of polymer-lean material.

After phase separation, the film-like article is typically transparent and can be processed as either a diluent-out or a diluent-in product into microporous film articles. Diluent-out film is made by extracting substantially all of the diluent from the film using a volatile solvent. This solvent is then evaporated away leaving behind air voids where the diluent had been, thus creating a porous film. To increase the air void volume, the film is then oriented or stretched in at least one direction and preferably in both the down-web (also called the longitudinal or the machine) and transverse (also called the cross-web) directions. Diluent-in films are made by simply by passing the extraction step and orienting the film. After orienting, the diluent is trapped in the amorphous portions of the polymer and the internal surfaces of the porous structure which makes the porous film dry to the touch. This method also avoids the expensive and rate-limiting extraction step.

In particular, the TIPS process involves four steps:

(1) melt blending to form a solution comprising about 10 to 90 parts by weight of a polymer component, and about 90 to 10 parts by weight, based on a total solution content, of a diluent component, said diluent component being miscible with the polymer component at a temperature above the melting temperature of the polymer component, or the liquid-liquid phase separation temperature of the total solution;

(2) shaping the solution;

(3) phase separating the shaped solution to form phase separated material, i.e., polymer, regions through either (i) crystallization of the polymer component to form a network of polymer domains, or (ii) liquid-liquid phase separation to form networks of a polymer-lean phase; and (4) creating regions of air adjacent to the material regions to form the porous article.

The structure can be varied by manipulation of six process variables: (1) quench rate (time for the polymer/diluent solution to cool and phase separate), (2) heterogeneous nucleating agent presence and concentration (useful with solid/liquid TIPS), (3) polymer component to diluent component weight ratio, (4) stretch, (5) diluent extraction, and (6) annealing.

The phase separation step to form the desirable size of material regions can be carried out by (1) cooling the solution fast enough, (2) using nucleating agents (with solid/liquid TIPS), or (3) a combination of both. In TIPS, cooling can be achieved by maximizing the intimate contact of the hot solution to a quenching surface or medium. Typically microporous films made by the solid/liquid TIPS process are cooled by casting on a patterned roll. Alternatively, microporous TIPS may also be cast on a smooth wheel; the desired performance properties would determine the preferred quenching method. (The TIPS process is also described in, for example, U.S. Pat. No. 5,976,686, which is incorporated herein by reference.)

The PVDF utilized in the articles and process of the present invention is not limited to a single PVDF polymer. References to PVDF generally include PVDF resin, homopolymers, copolymers, and polymer blends where the majority polymer is PVDF. PVDF also includes or refers to closely related derivatives of PVDF. Examples of PVDF resins suitable for use in the present invention are available from Solvay Solexis of Thorofare, N.J. under the tradenames HYLAR and SOLEF and from AtoFina Chemicals, Inc. of Philadelphia, Pa. under the tradename KYNAR. Individual resins are listed in the examples section below. These PVDF resins generally have crystallinity ratios of approximately 0.3 to approximately 0.4, but the invention is not so limited. Additionally, the PVDF resin employed may vary in properties such as molecular weight and melt flow. The melt flow indices generally varied between approximately 0.13 to approximately 6.0 at 230° C., 5 kg. Although it is known that longer chains or lower melt flow may increase the strength of the resulting article, the invention is not so limited.

The microporous PVDF films are produced from the TIPS process utilizing glyceryl triacetate as the diluent. Glyceryl triacetate, in addition to functioning as a diluent for PVDF in TIPS processes, also has additional advantages related to its non-hazardous nature. Glyceryl triacetate has been previously used as a food additive and is therefore non-toxic. The glyceryl triacetate can remain in the film or be removed either partially or almost completely. Glyceryl triacetate can readily be removed from PVDF microporous membranes using water as a solvent. Additionally, the by-products or effluents are glycerol and acetic acid, both of which are also non-toxic and sewerable. There are considerable economic and environmental advantages to not requiring or producing organic solvents that must be disposed of during the removal process.

A preferred range of PVDF to diluent in the present invention ranges from approximately 60:40 to approximately 40:60 depending on the properties desired. Glyceryl triacetate used as a diluent in the present invention is available from Eastman Kodak Company of Rochester, N.Y. under the tradename TRIACETIN. A particularly preferred range of PVDF to glyceryl triacetate is approximately 50:50 to 40:60.

The method of the present invention by the TIPS process also uses nucleating agents to manipulate and improve the properties of PVDF films. Nucleating agents generally enhance the initiation of crystallization sites and induce crystallization of the PVDF from the liquid state thereby increasing the rate of crystallization. The increase in rate of crystallization generally causes a reduction in the size of the spherulites or particles of the crystallized polymer. Thus, the nucleating agent employed should be a solid at the crystallization temperature of the polymer. Evidence of successful size reduction of the spherulites does not by itself guarantee that the nucleating agent has facilitated the production of a PVDF film that has sufficient strength to withstand the orienting to develop the microporous structure.

The use of nucleating agent in accordance with the present invention substantially accelerates the crystallization of the PVDF, thereby resulting in a more uniform, stronger microstructure. The stronger, more uniform microstructure from successful nucleation of the PVDF has an increased number of tie fibrils per unit volume and allows for greater stretching or orienting of the film so as to provide higher porosity and greater tensile strength than previously achievable. These properties additionally facilitate the use of thinner membranes, less than 2.0 mil (50 µm), with the membranes being sufficiently strong so as to not require reinforcement. Although nucleating agents for use in TIPS processes are known in conjunction with the production of microporous articles from other polymer types, those nucleating agents did not readily extend to the production of microporous membranes from PVDF.

The present invention utilizes particular members of a class of pigments called "vat type" pigments to nucleate the PVDF. These organic pigments include anthraquinones, perylenes, flavanthrones, and indanthrones. The Colour Index (CI) identifies each pigment by giving the compound a unique "Colour Index Name (CI Name) and a "Colour Index Number" (CI Number). Classification of pigments can be done by grouping pigments by either chemical constitution or by coloristic properties. Some pigments are "nonclassifed", for example Indanthrone Blue (CI 69800 Pigment Blue 60). Perylene pigments include the dianhydride and diimide of perylene tetracarboxylic acid along with derivative of the diimide. Anthraquinone pigments are structurally or synthetically derived from the anthraquinone molecule.

Materials found to successfully nucleate PVDF include, but are not limited to: CI 67300 Vat Yellow 2, designated as Indanthrene Yellow GCN available from TCI America of Portland, Oreg. ("TCI"); CI 70600 Pigment Yellow 24, designated as Flavanthrone also available from TCI; CI 69800 Pigment Blue 60, an indanthrone available from Ciba Specialty Chemicals of Hawthorne, N.Y. under the trademark CHROMOPHTAL Blue A3R; CI 71130 Pigment Red 179, a perylene available from Bayer Corporation—Coatings and Colorants of Pittsburgh, Pa. under the trademark PERRINDO Maroon R-6438; and CI 58055:1 Pigment Violet 5:1, an anthraquinone available from Bayer Corporation—Coatings and Colorants of Pittsburgh, Pa. under the trademark FANCHON Maroon MV7013. The preferred vat type pigments used as nucleating agents are Pigment Blue 60 (CI No. 69800), Pigment Red 179 (CI No. 71130), Pigment Violet 5:1 (CI No. 58055:1), Vat Yellow 2 (CI No 67300), and Pigment Yellow 24 (CI No. 70600).

Additionally, it was determined that nanometer-sized particles of polytetrafluoroethylene (PTFE) also successfully nucleate PVDF. PTFE had previously been used to produce dense, non-porous PVDF films in contrast to the microporous films of the present invention. To successfully nucleate PVDF for the production of microporous films, the nanometer sized particles of PTFE need to be dispersed evenly throughout the PVDF. Therefore, aggregation of the PTFE particles is not desirable. Examples of suitable methods for dispersing PTFE for use as a nucleating agent in the present invention are described below.

One method is to suspend nanometer-sized particles of PTFE in an aqueous solution such as DYNEON TF-5235 available from Dyneon Corp. of Oakdale, Minn. The dispersion of PTFE nanoparicles is coated/spread onto the PVDF resin pellets. The PVDF pellets are then dried, leaving the PTFE coated on the resin pellets prior to their use in the TIPS process. The solution is not limited to water. Any solution that does not otherwise react with the resin pellets or PTFE and that may be volatilized or remain in the resulting article without effect may be used. The separate drying step may be omitted where proper venting is incorporated during melting of the resin during the TIPS process.

Another method uses nanometer-sized particles of PTFE in the form of Metablen A-3000 available from Mitsubishi Rayon Corporation of New York, N.Y. The PTFE particles are wrapped in a second polymer wherein the second polymer is miscible in the melt blend (described below). One example is nanometer-sized PTFE particles wrapped in polymethylmethacrylate (PMMA). The PMMA aids in dispersion of the PTFE particles as the PVDF resin, diluent and PTFE (in the form of Metablen A-3000) is mixed. The PTFE sheds the PMMA coat as the PMMA melts during the TIPS process. The PTFE particles do not melt and are exposed to nucleate PVDF crystallization.

Generally, a nucleating agent is premixed with the diluent, or alternatively, the resin prior to melt blending the mixture during the TIPS process. For example, the pigments used as nucleating agents in the present invention may be mixed with the glyceryl triacetate on a roto-shear mixer or, a Mini-Zeta bead mill. The PTFE is pre-compounded as described above and fed via a pellet feeder, or alternatively, fed into the melt blend via a powder feeder.

Additionally, certain conventional additives may be blended with the PVDF, or glyceryl triacetate and/or melt blend thereof. When used, the conventional additives should be limited in quantity so as not to interfere with the formation of the microporous films and so not to result in unwanted exuding of the additive. Such additives may include antistatic materials, dyes, plasticizers, UV absorbers, and the like. The amount of additives is typically less than 10 percent of the weight of the polymer components, preferably less than 2 percent by weight.

The use of PVDF, glyceryl triacetate, and specific nucleating agents to manufacture the microporous PVDF films are further described below in the context of the TIPS process.

First, a melt blend comprising a mixture of PVDF resin, glyceryl triacetate and nucleating agent is prepared. Various components may be pre-compounded prior to melting, for example, the nucleating agents described herein. The term of melt blend refers to the PVDF polymer, glyceryl triacetate and nucleating agent blend, wherein at least the PVDF and glyceryl triacetate are in the molten, semi-liquid or liquid state. The melt blend is prepared by mixing approximately 40 to 60 percent by weight of crystallizable PVDF thermoplastic polymer with approximately 60 to 40 percent by weight of glyceryl triacetate, and additionally including a nucleating agent. The nucleating agent represents about 0.1 to about 1%, more particularly about 0.25 to about 1% by total weight of the melt blend. Alternatively, the nucleating agent represents about 0.2 to about 2.5% by weight of the polymer. The melt blend is heated to at least the melting temperature of the PVDF. For ease of handling the melt blend and ease in its casting, it is convenient to initiate the formation of the melt blend by heating the mixture at a temperature in a range of about 25° C. to about 100° C. above the melting temperature of the PVDF.

Microporous films of the present invention are prepared by casting the shaped article, such as a sheet or layer, from the melt blend comprising the PVDF, glyceryl triacetate and nucleating agent. The properties of the microporous films are dependent upon, but not limited to, the ratio of polymer to diluent in the melt blend, the type and amount of nucleating agent employed, the rate of cooling, and the stretch ratios and temperatures. During cooling, heat is removed from the melt blend until the crystallization temperature of the PVDF in the melt blend is reached, and controlled crystallization and phase separation of the PVDF can begin. Cooling temperatures greater than about 125° C. below the equilibrium melting point of the pure crystallizable PVDF polymer cause too rapid quenching of the melt blend. The materials can be rendered uniformly microporous by orienting, but are inherently weak in the washed or diluent-out condition compared to those quenched at higher temperatures. By contrast, U.S. Pat. No. 4,539,256 describes cooling temperatures more than about 225° C. below the equilibrium melting point of the pure crystallizable PVDF polymer cause too rapid quenching of the melt blend and could result in single-phase films, which although strong and transparent, are substantially incapable of being rendered uniformly microporous by orienting. At the desired high diluent levels, casting wheel temperatures of less than about 74° C. below the equilibrium melting point of the pure crystallizable PVDF polymer provides for too slow a phase separation (crystallization) of the PVDF, which, without additional quenching lubricants such as TRIACETIN or water, will cause the material to adhere to the patterned wheel. Thus, cooling temperatures between approximately 71° C. to 131° C. below the equilibrium melting point of the pure crystallizable PVDF are obtainable without process modifications with the preferred temperatures between 82° C. and 124° C. below the equilibrium melting point of the pure crystallizable PVDF.

One method is to cool the cast article in a quench bath at an appropriate temperature. Another method is to use a casting wheel where the temperature of the wheel is controlled to within the desired cooling temperature range similar to the quench bath.

Figure 3:
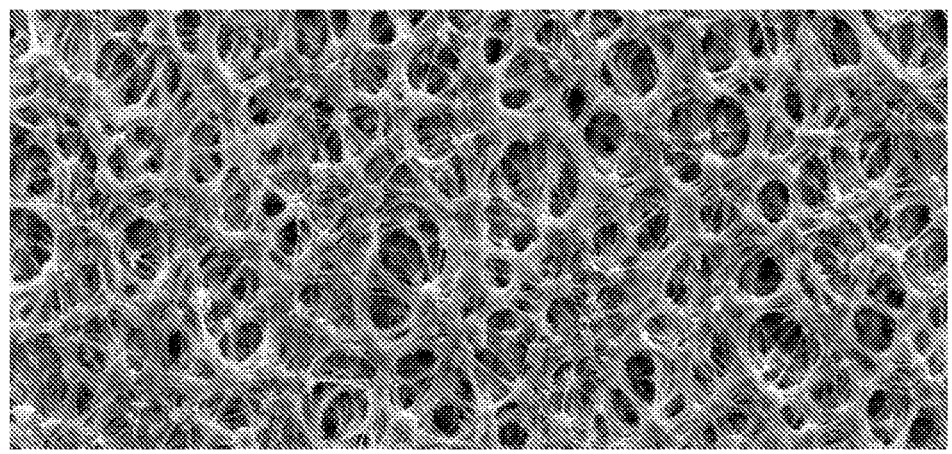
FIG. 3 is a micrograph showing the node and fibril nature of the membrane structure.
Figure 4A:
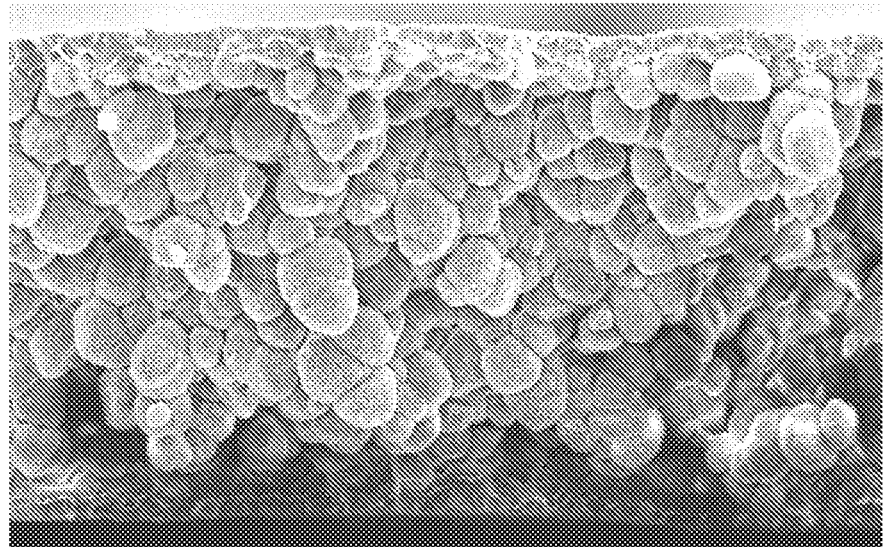
FIGS. 4A and B are micrographs of membrane cross-sections showing the microstructure achieved without and with nucleation. The size of the spherulites varies with larger spherulites being obtained with no nucleation (A) and smaller spherulites with nucleation (B).
Figure 4B:
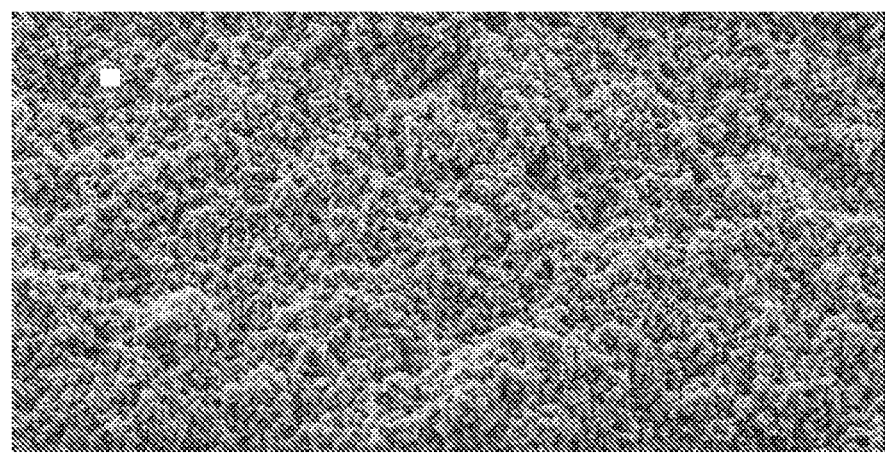

The cast films formed from the TIPS process are generally solid and transparent before the optional diluent removal and orienting. The microstructure of the cast films may be described as spherulites and aggregates of spherulites of the PVDF with glyceryl triacetate occupying the space between particles (See FIG. 3 and FIGS. 4A and B). Adjacent spherulites and aggregates of PVDF are distinct, but they have a plurality of zones of continuity. The PVDF spherulites and aggregates are generally surrounded or coated by the glyceryl triacetate, but not completely. There are areas of contact between adjacent PVDF spherulites and aggregates where there is a continuum of PVDF from one spherulite/aggregate to the next adjacent spherulite/aggregate in such zones of continuity.

On orienting, the PVDF spherulites and aggregates are pulled apart, permanently attenuating the polymer in zones of continuity; thereby forming the fibrils, forming minute voids between coated spherulites and aggregates, and creating a network of interconnected micropores. As used herein, "orienting" means such stretching beyond the elastic limit so as to introduce permanent set or elongation of the article, typically to obtain at least an increase in length of about 10% or expressed as a ratio, approximately 1.1 to 1.0. Stretching to provide an elongation of about 10% to about 1000% is typical. The actual amount of stretching required will depend upon the composition of the film and the degree of porosity (for example pore size) desired.

Stretching may be provided by any suitable device that can provide stretching in at least one direction and may provide stretching both in that direction and in the transverse direction. The stretching may be done sequentially or simultaneously in both directions. For example, a film may be oriented in both the machine direction and the transverse direction. Stretching should be uniform to obtain uniform and controlled porosity. Stretching in one direction typically causes the film to narrow or "neck" in the cross direction so stretching a film to provide an elongation of 50%, for example, does not produce a 50% increase in the surface area of the film.

Such permanent attenuation also renders the article permanently translucent. Also on orienting, if the diluent is not removed, the diluent remains coated on or surrounds, at least partially, the surfaces of the resultant PVDF particles. Typically, the microporous films are dimensionally stabilized according to conventional well-known techniques by heating the oriented film while it is restrained at a heat-stabilizing temperature. This is also referred to annealing.

The nucleated films have a microporous structure characterized by a multiplicity of spaced (that is separated from one another), randomly dispersed, non-uniform shaped, equiaxed particles of PVDF connected by fibrils, with nucleating agent in the interior of the particles. (Equiaxed means having approximately equal dimensions in all directions.) If the diluent is not removed, the particle of PVDF is also coated with the glyceryl triacetate.

Where the glyceryl triacetate diluent is removed from the microporous film, a unique microporous sheet of PVDF with nucleating agent incorporated therein remains. The resultant microporous film may be imbibed with various materials to provide any one of a variety of specific functions thereby providing unique articles. The film may be imbibed after removing the glyceryl triacetate, or alternatively, the glyceryl triacetate may be left in the microporous PVDF film prior to the imbibing process. Several methods are known for imbibing microporous films including: multiple dipping, long soak, vacuum, hydraulic press and evaporation. Examples of imbibing materials that might be employed in the present invention include, but are not limited to: pharmaceuticals, fragrances, antistatic agents, surfactants, pesticides, and solid particulate materials. Certain materials, such as antistatic agents or surfactants, may be imbibed without prior removal of the glyceryl triacetate diluent.

The microporous film, either before or after removal of the diluent, may be further modified by depositing any one of a variety of compositions thereon using any one of a variety of known coating or deposition techniques. For example, the microporous film may be coated with metal by vapor deposition or sputtering techniques, or coated with adhesives, aqueous or solvent base coating compositions or dyes. Coating may be accomplished by conventional techniques such as roll coating, spray coating, dip coating or any other coating techniques.

The microporous films may be laminated to any one of a variety of other structures, such as other sheet materials to provide composite structures. Lamination can be accomplished by conventional techniques such as adhesive bonding, spot welding, or by other techniques that do not destroy or otherwise interfere with the porosity or create undesirable porosity or perforations.

The microporous PVDF of the present invention is generally in the form of a sheet or film, although other article shapes are contemplated and may be formed. For example, the article may be in the form of a sheet, tube, filament, or hollow fiber.

Polyvinylidene fluoride (PVDF) microporous membranes are described below for use as ion conductive membranes (ICMs), including ion exchange membranes. However, PVDF membranes are not restricted to that use. Their chemical stability and relative strength are also useful in various filtering applications. The microporous films made through this invention may be used in a variety of applications, such as, ion conductive membranes, separators in electrochemical cells, diffusion barriers, viral barriers, absorbent clothes, and ultrafiltration of colloidal matter. In addition, PVDF membranes have low specific protein binding that may be useful in biotechnology related applications. PVDF membranes are also inherently flame retardant without the addition of other chemicals, which can be a cost saving device in applications requiring that characteristic.

The properties of PVDF microporous films when customized for use as ion conductive membranes offer advantages over prior art ion conductive membranes. The prior art single component membranes have two primary problems: strength and stability. The membranes themselves are often very fragile. Therefore, such membranes generally must have increased thickness and/or must either be mounted or otherwise attached to a support to avoid puncture and/or tearing. Additionally, conventional membranes made solely of polymer electrolytes are very expensive and extremely fragile.

Ion conductive membranes form a gaseous barrier blocking flow of the reactants within an electrochemical cell structure, while providing ionic conductivity between an anode and a cathode located on opposite sides of the membrane. Ion conductive membranes may be conductive of only ions either of positive charge or negative charge, that is, either a cation exchange membrane or an anion exchange membrane; or only of one type of ion, for example, a proton exchange membrane. Proton exchange membranes (PEMs) are one type of ion conductive membranes used in membrane electrode assemblies that can be used to produce fuel cells, electrolyzers and electrochemical reactors. The present disclosure focuses on composite ion conductive membranes, including proton exchange membranes, for use in fuel cells, although the analogy to electrolyzers and electrochemical reactors is straightforward.

Figure 2:
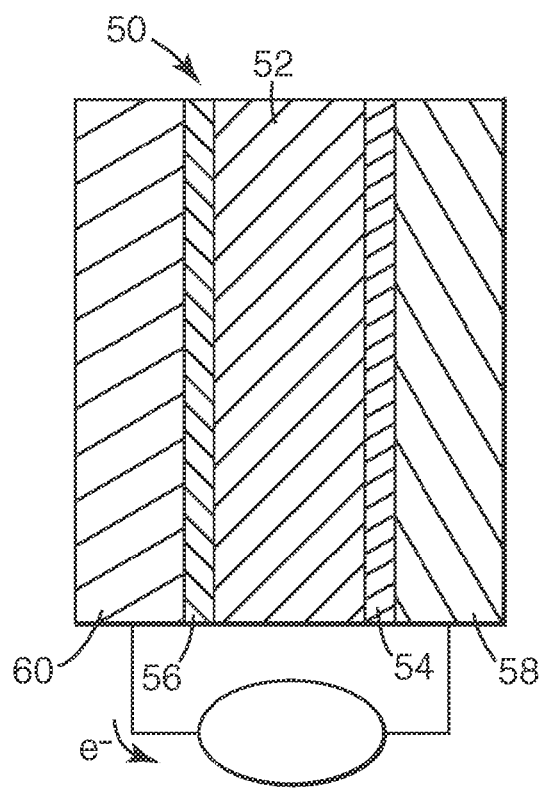
FIG. 2 is a schematic cross-section of a five layer MEA.

An example five layer MEA generally indicated as 50 is illustrated in FIG. 2. The various layers for the electrochemical oxidation of a fuel and reduction of an oxidizing agent to produce electric current include: an ion conductive membrane 52, catalyst layers 54, 56, and electrode backing layers 58, 60. The shape and size of the components of the electrochemical cell can vary over a wide range depending on the particular design. MEAs can include: porous metal films or planar distributions of metal particles or carbon supported catalyst powders deposited on the surface The typical flow of reactants is additionally depicted in FIG. 2.

A composite ion conductive membrane is made by imbibing the microporous structure of the microporous PVDF film with an ion conductive material. The composite ICMs offer superior properties over single component membranes when used in MEAs. The composite ICMs can be made thinner and stronger while giving equivalent conductivity with less electrolyte, and have more dimensional stability even after becoming saturated with water. However, because the membranes employed are initially porous, the gas permeability of the resulting membrane depends in part on the degree to which the membrane is filled by the electrolyte.

While being conductive of protons or other ions, the ion conductive membrane comprising a microporous PVDF film is nonconductive with respect to electrons and gaseous reactants. To prevent the passage of gaseous reactants, the ion conductive membrane should have sufficient thickness for mechanical stability and should be effectively nonpermeable (pinhole free). Conduction of gaseous reactants through the ion conductive membrane could result in undesirable direct reaction of the reactants. Similarly, the conduction of electrons through proton exchange membrane could result in an undesirable short circuit of the cell. PVDF is advantageously non-conductive. If the membrane fails causing direct reaction of the reactants or a short circuit, the energy released by the reaction of the fuel with the oxidizing agent cannot be used to produce electricity, thereby defeating the purpose of the membrane electrode assembly.

Pore size of the microporous films is controlled in ICM applications. The effective pore size is at least several times the mean free path of the flowing molecules and may be varied with the range of approximately from several micrometers down to about 100 Å. In ICMs, the pore size needs to be large enough that the electrolyte is able to migrate into the membrane. For example, a pore size greater than approximately 0.4 microns is suitable. It is desirable that the electrolyte fills or nearly completely fills the pores of the microporous membranes. If the pore size of the membrane is too small, the membrane will actually act as a filter during the electrolyte introduction process, thereby resulting in a nonfunctional or a poorly functional ICM. The upper end of the pore size range will also be controlled because of issues of membrane strength and electrolyte retention within the membrane.

In one implementation of the invention, the PVDF microporous films are suitably impregnated with the ion conducting electrolyte, effectively filling the interior volume of the membrane for use as a PEM or other type of ion conductive membrane. The ion conducting electrolyte should be chemically stable and compatible with the catalysts used in the MEA so that the catalyst is not poisoned. The ion conducting electrolyte is preferably a polymer electrolyte, frequently referred to as an ionomer. Polymer electrolytes can be made from a variety of polymers including, for example, polyethylene oxide, poly (ethylene succinate), poly (β-propiolactone), and sulfonated fluoropolymers such as NAFION commercially available from E.I. DuPont De Nemours and Company, Wilmington, Del.

The amount of electrolyte solution used in filling the microporous film should be sufficient to achieve the degree of filling desired but is preferably in excess of that which would theoretically fill the membrane. The amount of electrolyte imbibed in the pores or adsorbed on the fibrils of the membrane after the filling should be sufficient to fill between 95% and 100% of the available pore volume. Preferably, more than 95% of the available pore volume is filled. Most preferably, between 95% and 100% of the available pore volume is filled. The electrolyte may be present as a coating on the structural fibrils of the porous membrane or it may wet out the membrane filling the entire cross-section of some pores.

The electrolyte solution used for imbibing the microporous membrane is more accurately described as a dispersion of the ion conducting electrolyte with particles of approximately 260 Å, as determined by measurements of radius of gyration of the micelles using Small Angle X-ray scattering (SAXS), in solution at a concentration of typically 5 to 20 weight percent. It is important that the pores of the microporous membranes be of adequate size to allow the electrolyte to enter the membrane. If the pore size is too small, the microporous membrane instead acts as a filter removing the electrolyte from solution and at the same time failing to incorporate the electrolyte into the pores of the membrane. The properties of the electrolyte are considered in determining the required pore size. Ion conducting electrolytes with higher molecular weights and/or that are heavily branched or cross-linked will typically require larger pore sizes than lower molecular weight, linear molecules.

It is not necessary to remove the glyceryl triacetate diluent before imbibing prior to imbibing the PVDF membrane with ion conducting electrolyte. The microporous PVDF membranes in which the diluent has not been removed are referred to as "diluent in". Microporous PVDF membranes with the diluent removed, referred to as "diluent out" may also be successfully imbibed with ion conducting electrolyte for use as a PEM.

The microporous PVDF membranes can become hydrophobic after removal of the diluent. To assist filling of a hydrophobic, diluent out membrane with the electrolyte solution, which is commonly aqueous and/or ionic in nature, the membrane is treated prior to filling. Techniques that may be used include: pre-wetting, radiation grafting, corona treating, or other chemical treatment. For example, the diluent out membranes may be pre-wet with a solution of n-propanol and glycerol. The excess n-propanol/glycerol can be removed by squeegee prior to laying the microporous membrane into the dispensed electrolyte solution.

EXAMPLES

The following examples are given to show microporous materials that have been made in accordance with the present invention. However, it will be understood that the following examples are exemplary only, and are not intended to be comprehensive of the many different microporous materials which may be made in accordance with the present invention Materials PVDF Polymers:
HYLAR MP-20 1,1-difluoroethane based polymer, 166-170° C. Melt Temperature, 1.57 Melt Flow Index (Solvay Solexis, Thorofare, N.J.)
HYLAR MP-32 1,1-difluoroethane based polymer, 166-170° C. Melt Temperature, 0.13 Melt Flow Index (Solvay Solexis, Thorofare, N.J.)
Kynar 1000HD 1,1-difluoroethene based polymer, 166-170° C. Melt Temperature, 1.86 Melt Flow Index (Atofina Chemicals Philadelphia, Pa.)
SOLEF 1010 PVDF polymer, 170-175° C. Melt Temperature, 5.33 Melt Flow Index (Solvay Solexis, Thorofare, N.J.)
SOLEF 1012 PVDF polymer, 170-175° C. Melt Temperature, 1.3 Melt Flow Index (Solvay Solexis, Thorofare, N.J.)
SOLEF 1015 PVDF polymer, 170-175° C. Melt Temperature, 0.14 Melt Flow Index (Solvay Solexis, Thorofare, N.J.)

Diluents:
TRIACETIN glyceryl triacetate (Eastman Kodak Co., Rochester, N.Y.)

Nucleating Agents:
CI 69800, Pigment Blue 60, Indanthrone, CHROMOPHTAL Blue A3R (Ciba Specialty Chemicals, Hawthorne, N.Y.)
CI 71130, Pigment Red 179, Perylene, PERRINDO Maroon R-6438 (Bayer Coatings and Colorants Corp., Pittsburgh, Pa.)
METABLEN A-3000 nanometer sized PTFE particles coated with polymethylmethacrylate (Mitsubishi Rayon Corp., New York, N.Y.)
DYNEON TF-5235: An aqueous dispersion of 225 nm PTFE particles. (Dyneon Corp., Oakdale, Minn.)

Ion Conducting Electrolytes:
NAFION 1000: A solution of a hydrolyzed copolymer of polytetrafluoroethylene with perfluorosulfonylethoxyvinylether with conversion of its sulfonyl radical to a sulfonic radical. Solution composition: 21.53% solids, 21.33% water, 22.20% ethanol, 33.71% propanol and 1.23% other. (DuPont Chemicals Company, Wilmington, Del.)

Test Methods

Tensile Strength:
The tensile strength at break was measured according to ASTM D882 using an INSTRON Model 1122 tensile tester with a crosshead speed of 25 cm/min and a gage length of 5 cm. The width of the test specimens was 2.5 cm. The tensile strength at the break point of the sample was calculated by dividing the load (force) at the break point by the original cross-sectional area of the specimen and is reported in kg-force/cm$^2$. The percent elongation at the break point was calculated by dividing the elongation at the break point by the original gage length and multiplying by 100.

Gurley Porosity:
Gurley is a measure of the resistance to gas flow of a membrane, expressed as the time necessary for a given volume of gas to pass through a standard area of the membrane under standard conditions, as specified in ASTM D726-58, Method A. Gurley is the time in seconds for 50 cubic centimeters (cc) of air, or another specified volume, to pass through 6.35 cm$^2$ (one square inch) of the membrane at a pressure of 124 mm of water. The film sample was clamped between cylindrical rings, the uppermost of which contained a piston and the specified volume of air, when released, the piston applied pressure, under its own weight, to the air in the upper cylinder and the time taken for the specified volume of air to pass through the membrane was measured. A membrane with a Gurley value less than approximately 10 sec/50 cc is preferred for producing composite ion conductive membranes.

Bubble Point:
The Bubble Point pore size is the bubble point value representing the largest effective pore size measured in microns according to ASTM-F-316-80.

H Pump:
The H pump test applies a current causing the hydrogen fuel to split into protons on the anode side of the membrane electrode assembly. The protons pass through the membrane and recombine on the cathode side to make hydrogen—$H_2$. This hydrogen to hydrogen reaction to split and recombine hydrogen is used for diagnostics. H pump measures the resistance of the hydrogen ions as they move through the membrane in the z-axis (normal to the membrane). It is possible to use the H pump value to calculate the membrane resistance.

H₂ Crossover:

H$_2$ crossover measures the diffusion of hydrogen through the membrane. Higher values of H$_2$ crossover generally indicate greater diffusion of H$_2$. The composite PVDF ICMs typically have less diffusion of hydrogen compared to the conventional dense ionomer membranes. H$_2$ crossover is also used to determine if there are any pinholes in the membrane prior to assembly into an MEA.

MEA Performance 0.8V & 0.6V:

The values for Performance at 0.8V and Performance at 0.6V are used to evaluate the performance of an MEA by obtaining a voltage versus current plot or polarization curve of the MEA at 70° C. These cells were run with 100% RH (relative humidity) hydrogen and 100% RH air. The catalyst loading was 0.4 mg/cm$^2$ on both the anode and cathode. The resultant polarization curve related the current flowing through the cell to the potential difference across the cell.

Puncture Strength:

The Puncture Strength Test measures the puncture peak load of a membrane. In particular, the Puncture Strength Test was used to measure the puncture peak load of a cast NAFION membrane or a composite PVDF/NAFION membrane. The instrument used was an INSTRON Series 5500R with a ION load cell. The puncture tip is a NAJET Mandrel Mounted Series #400—Material HSSC (Item 0201) shank measuring 0.040" (0.10 cm) mounted on a 0.090" (0.23 cm) mandrel with a tip diameter of 0.0030" (0.0076 cm). The puncture strength measures the force per square centimeter necessary to puncture a film of known thickness. The sample size was 1.5" (3.8 cm)×1.5" (3.8 cm) square. The crosshead speed was 2 mm/min.

Example 1-7

Microporous PVDF films were prepared using apparatus similar to that shown in FIG. 1 using the method described below. The properties of these films are shown below in TABLE 1. TABLE 1 illustrates the effectiveness of CI 69800 Pigment Blue 60, CI 71130 Pigment Red 179 and PTFE as nucleating agents compared to a non-nucleated control PVDF film. The nucleating agent used and the amount were varied between the films and is noted in TABLE 1 as percent by total weight of the melt blend. The thickness of each film was measured and is shown in TABLE 1. The break tensile strength of the films in both the machine direction (MD) and transverse direction (TD) was measured. The nucleated films demonstrated superior break strength and elongation compared to the non-nucleated control which could not be oriented to any appreciable extent.

With reference to FIG. 1, the PVDF polymer pellets (SOLEF 1012) were introduced into the hopper 12 of a 25 mm co-rotating twin-screw extruder with an approximate total extrusion rate of 3.6-4.5 kilograms per hour and a screw speed of 150 RPM. For Examples 1-5, the nucleating agent, in powder form, was premixed with the glyceryl triacetate diluent in a Mini-Zeta bead mill and then fed, with additional diluent by a feeding device 13 into the extruder 10 via a port 11 in the extruder wall intermediate the hopper 12 and the extruder exit 30. For Examples 6-7, the nucleating agent, in dispersion form, was coated onto the PVDF pellets as previously described and then fed via the hopper 12. The polymer to diluent ratio was varied slightly in accordance with the amount of nucleator used, but was generally approximately 0.41:1.0. The extruder had eight zones with a temperature profile of zone 1 at 204° C., zone 2 at 266° C., zone 3 at 266° C., zone 4 at 221° C., zone 5 at 182° C., zone 6 at 182° C., zone 7 at 182° C. and zone 8 at 182° C. (shown in FIG. 1 as zones 16, 18, 20, 22, 24, 26, and 28, respectively). The melt was subsequently pumped through a double-chromed coathanger slot film die 32, cast onto a chrome roll 36 that ranged from 52° C. for Example 2 to 63° C. for Examples 1 and 3-7, and then wound into a roll. Film samples were cut from the rolls and placed in metal frames measuring 15 cm by 28 cm. The frames were then placed in small pans of deionized water for 20 minutes (effectively removing the TRIACETIN diluent from the films) and then allowed to dry in ambient air. The washed film samples were then stretched biaxially 1.75 by 1.75 on a TM Long Film Stretcher (TM Long Co., Somerville, N.J.) at 132° C. The films were held in the stretcher for 2-5 minutes at 132° C. after stretching was complete to anneal the film.

Alternatively, the layer 34 could be fed into a liquid quench bath or a gas quench bath, maintained at a suitable temperature below the crystallization temperature of PVDF using water or other suitable solvent. Where the quench bath 38 uses water gas or other suitable solvent, the bath functions to remove the glyceryl triacetate diluent. The film is then directed to a machine-direction stretching device 42 and a transverse-direction stretching device 44, and then to a take-up roller 46 for winding into a roll.

TABLE 1

| Example | % Nucleating Agent | Thickness (μm) | MD Break stress kg/cm$^2$ | MD Break Elong % | TD Break stress kg/cm$^2$ | TD Break Elong % |
|---|---|---|---|---|---|---|
| Control 1 | None | — | — | — | — | — |
| 1 | 0.25 P.B. 60 | 54.6 | 104 | 19.5 | 112 | 18.1 |
| 2 | 0.5 P.B. 60 | 57.1 | 121 | 34.8 | 138 | 29.2 |
| 3 | 0.25 P.R. 179 | 42.9 | 129 | 13.7 | 126 | 12.8 |
| 4 | 0.5 P.R. 179 | 49.2 | 111 | 12.7 | 119 | 12.8 |
| 5 | 1.0 P.R. 179 | 46.7 | 105 | 15.2 | 91 | 11.7 |
| 6 | 0.25 PTFE | 57.5 | 102 | 15.7 | 116 | 12.9 |
| 7 | 0.5 PTFE | 54.6 | 111 | 17.2 | 80 | 9.0 |

Examples 8-19

Microporous PVDF films of Examples 10-17 and 19 were prepared as in Examples 1-7 (i.e. samples cut and placed in frames measuring 15 cm by 28 cm and then places in small pans of deionized water for 20 minutes). The type of PVDF resin, the polymer to diluent ratio, the chrome roll temperature (i.e. the rate of cooling), and the stretch ratios and temperatures, were varied to produce a range of properties as shown in TABLE 2 below. P.B. 60 was used as the nucleator at various percentages by total weight of the melt blend. Examples 8-12 and 14 had a prewashed TRIACETIN content of 50% by weight, Example 13 had a prewashed TRIACETIN content of 55% by weight, and Examples 15-19 had a prewashed TRIACETIN content of 58% by weight. The chrome roll was varied from 52° C. to 82° C. Subsequent to the chrome roll, the quenched extrudate of Examples 8, 9, and 18 was fed through a water wash bath maintained at ambient temperature (22° C.) to remove the glyceryl triacetate diluent.

The washed film samples of Examples 10-17 and 19 were then stretched biaxially 2×2 on a TM Long Film Stretcher at 132° C. The films were held in the stretcher for 2-5 minutes at 132° C. after stretching was complete to anneal the film. Examples 8-9 were stretched in-line biaxially 2×2 and Example 18 was stretched biaxially 1.7×1.85 on a length orienter 42 and tenter 44 as shown in FIG. 1.

TABLE 2

| Example | % P.B. 60 Nucleating Agent | Polymer | Thickness (μm) | Chrome roll Temp (° C.) | Gurley, sec/50 cc | B.P. Pore Size, μm |
|---|---|---|---|---|---|---|
| 8 | 0.5 | SOLEF 1010 | 46 | 82 | >>600 | — |
| 9* | 0.5 | SOLEF 1010 | 61 | 60 | 166.0 | |
| 10 | 0.5 | HYLAR MP-32 | 41 | 52 | 148.9 | 0.19 |
| 11 | 0.5 | HYLAR MP-32 | 38 | 63 | 155.7 | 0.26 |
| 12 | 0.5 | HYLAR MP-32 | 36 | 52 | 127.2 | 0.32 |
| 13 | 0.5 | HYLAR MP-32 | 43 | 57 | 30.7 | 0.58 |
| 14 | 0.25 | SOLEF 1012 | 41 | 52 | 96.9 | 0.84 |
| 15 | 0.5 | SOLEF 1012 | 46 | 52 | 7.0 | 1.01 |
| 16 | 0.5 | SOLEF 1012 | 48 | 63 | 6.0 | 1.14 |
| 17 | 0.5 | HYLAR MP-32 | 46 | 63 | 7.0 | 1.28 |
| 18 | 0.25 | SOLEF 1012 | 23 | 63 | 3.5 | 1.54 |
| 19 | 0.5 | HYLAR MP-32 | 43 | 63 | 4.5 | 1.66 |

Figure 5A:
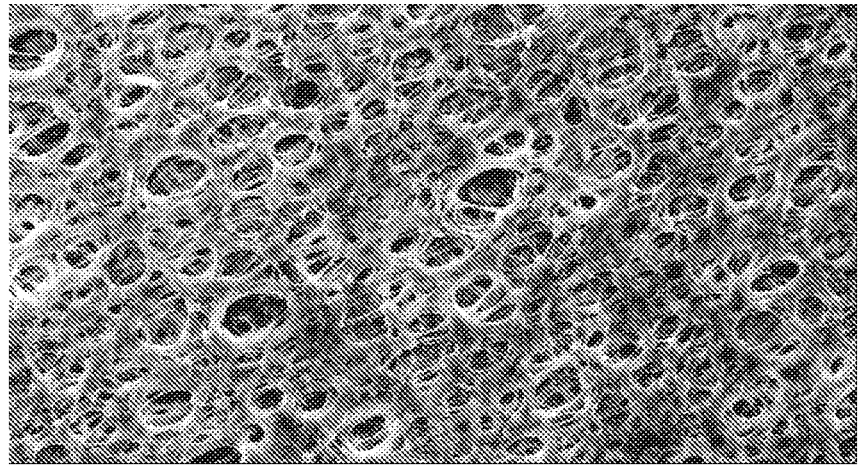
FIGS. 5A, B, and C are micrographs showing, respectively, the air side, wheel side, and cross section (wheel side up) of a microporous PVDF film having an asymmetric structure (see Example 9 below).
Figure 5B:
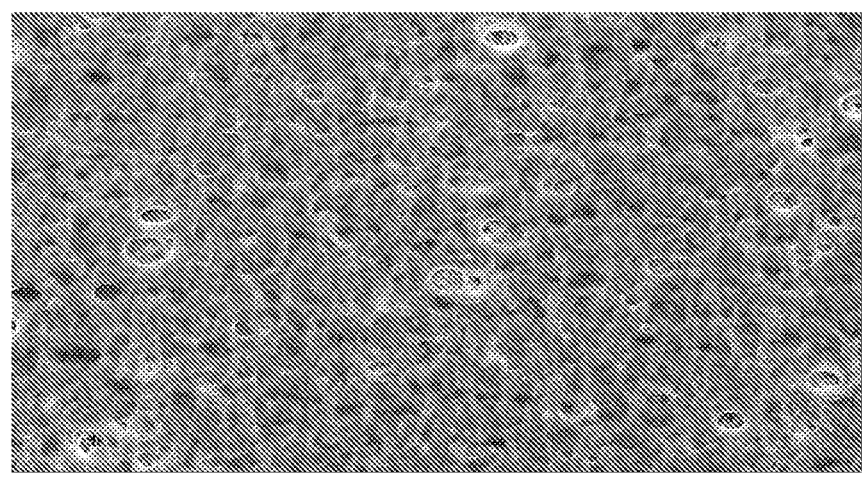
Figure 5C:
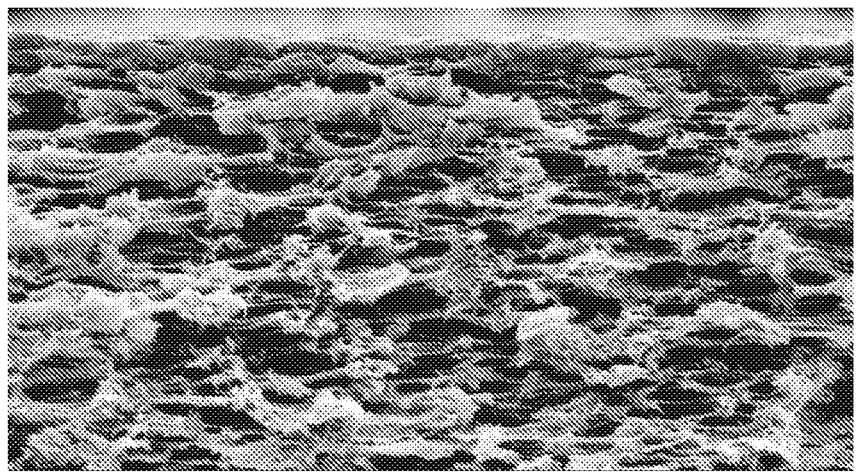

*Example 9 resulted in an asymmetric structure having a thin skin layer with relatively small pores and a thick core layer with relatively large pores. The skin layer corresponded to the side of the extrudate cast against the chrome roll (see FIGS. 5A, B, and C).

Examples 20-25

Microporous PVDF films for use as PEMs were prepared as in Examples 10-17 and 19 except the films were produced on a 40 mm co-rotating twin-screw extruder using an extrusion rate of 9 to 11.4 kilograms per hour and a barrel temperature profile of 216° C., 271° C., 221° C., 188° C., 188° C., 188° C., and 188° C. A screw speed of 150 RPM was used. The melt blend comprised PVDF and glyceryl triacetate diluent in a ratio ranging from approximately from 45:55 to approximately 40:60. CI 69800 Pigment Blue 60 was added to the melt blend in a concentration of approximately 0.4 percent by total weight of the melt blend. The melt blend was pumped through a double-chromed coat-hanger slot film die onto a cooled, patterned chrome roll. The chrome roll was engraved with a series of intersecting knurling lines (25 lines/cm) resulting in a series of raised pyramidal structures across the roll face having a height of approximately 140 microns. The chrome roll temperature ranged from approximately 35° C. to approximately 74° C. The films were not washed to remove the diluent. The films were then oriented as in Examples 8-9 and 18.

The PVDF microporous films were then impregnated with an ion conducting electrolyte (NAFION 1000), effectively filling the interior volume of the membrane for use as a PEM.

The microporous PVDF membranes were imbibed by coating each side of the membrane with equal amounts of NAFION 1000 ion conducting electrolyte solution using the following technique. Two glass plates were cleaned with isopropanol and water in a 50:50 solution. The microporous PVDF membrane was taped along an edge of a first plate and then laid over an adjacent second plate. Using an applicator gage, a controlled amount of the ion conducting solution was dispensed onto the first plate. The microporous membrane was laid back over the first plate; carefully into the dispensed electrolyte so as to avoid any ripples and bubbles. The electrolyte solution was allowed to diffuse through the membrane for 10-30 seconds. A controlled amount of electrolyte solution was then dispensed onto the microporous membrane supported by the first plate. The microporous membrane was then dried at 90° C. for 10 minutes and annealed at 160° C. for 10 minutes. The resulting ion conductive membrane (ICM) was subsequently assembled into a membrane electrode assembly for testing via the above described test methods. The membranes were hydrophilic in nature, which facilitated the coating of the membrane with the ionomer solution. Porosity and electrical properties of the ICMs are shown in TABLES 3 and 4 below.

TABLE 3

| Example | Casting Wheel Temperature (° C.) | % TRIACETIN diluent | Gurley sec/50 cc (before filling) | B.P. Pore Size, μm | Thickness (μm) |
|---|---|---|---|---|---|
| 20 | 74 | 56 | 35.2 | 1.06 | 18 |
| 21 | 63 | 56 | 24.3 | 1.25 | 18 |
| 22 | 63 | 58 | 11.1 | 1.39 | 15 |
| 23 | 63 | 58 | 11.1 | 1.39 | 20 |
| 24 | 74 | 56 | 35.2 | 1.06 | 13 |
| 25 | 63 | 58 | 11.1 | 1.39 | 31 |

TABLE 4

| Example | H pump mOhm-cm$^2$ | H$_2$ crossover (10/0 psi) mA/cm$^2$ | Performance at 0.8 V (A/cm$^2$) | Performance at 0.6 V (A/cm$^2$) |
|---|---|---|---|---|
| 20 | 300 | 1.1 | 0.12 | 0.43 |
| 21 | 270 | 2.5 | 0.13 | 0.46 |
| 22 | 210 | 5.1 | 0.16 | 0.54 |
| 23 | 176 | 2.5 | 0.16 | 0.53 |
| 24 | 320 | 2.5 | 0.12 | 0.43 |
| 25 | 206 | 0.95 | 0.20 | 0.61 |

Examples 26-30

Microporous PVDF films were prepared as in Examples 8-9 and whereby the TRIACETIN diluent was washed out of the membranes using a water wash bath immediately after the chrome roll. The microporous PVDF membranes became hydrophobic after removal of the diluent, making it difficult to fill the membrane pores with ion conducting solutions to prepare the membranes for use as a PEM. To decrease the hydrophobicity of the membrane, a solution of n-propanol and glycerol, ranging from approximately 65:35 to 75:25, was used to pre-wet the membrane using the following procedure. Two glass plates were cleaned with a 50:50 solution of isopropanol and water. A piece of microporous film was taped to one of the cleaned plates. The plates were then placed end to end and then, using an applicator gage, the "blank" glass plate was coated with the n-propanol/glycerol solution and the film carefully laid into the solution. A rubber roller was used to squeegee the excess solution off the film using broad strokes. The second plate was quickly coated with the NAFION 1000 ionomer solution using the cleaned/wiped applicator gage. The pre-wetted film was then laid into the ionomer solution, making sure to avoid trapping bubbles or creating wrinkles in the film. The ionomer solution was then allowed to diffuse through the membrane for 10-30 seconds. The top of the membrane was then coated with the desired thickness ionomer solution using the applicator gage. The membrane was then dried at 90° C. for 10 minutes and annealed at 160° C. for an additional 10 minutes. The resulting ion conductive membrane (ICM) was subsequently assembled into a membrane electrode assembly for testing via the above described test methods. Porosity and electrical properties of the ICMs are shown in TABLES 5 and 6 below.

TABLE 5

| Example | % P.B. 60 Nucleating Agent | % TRIACETIN diluent | Gurley sec/50 cc | B.P. Pore Size, μm | Thickness (μm) |
| --- | --- | --- | --- | --- | --- |
| 26 | 0.25 | 58 | 3.5 | 1.54 | 30.5 |
| 27 | 0.5 | 58 | 4.3 | 1.29 | 30.5 |
| 28 | 0.5 | 58 | 5.1 | 1.21 | 30.5 |
| 29 | 0.5 | 58 | 6.5 | 0.93 | 25.4 |
| 30 | 0.5 | 58 | 4.3 | 1.29 | 38.1 |

TABLE 6

| Example | $H_2$ pump mOhm-cm$^2$ | $H_2$ Xover (10/0 psi) mA/cm$^2$ | Perf @.8 V A/cm$^2$ | Perf @.6 V A/cm$^2$ |
| --- | --- | --- | --- | --- |
| 26 | 122 | 5.07 | 0.22 | 0.70 |
| 27 | 115 | 1.18 | 0.24 | 0.74 |
| 28 | 141 | 1.13 | 0.21 | 0.67 |
| 29 | 128 | 1.18 | 0.24 | 0.70 |
| 30 | 139 | 1.21 | 0.21 | 0.73 |

The PVDF ICMs of Examples 20-24 were also subjected to puncture tests to demonstrate their improved strength as compared to a conventional ICM prepared from a NAFION 1000 solution that was cast and then dried. Five different NAFION control films were produced and measured. The puncture strengths of the membranes were normalized by dividing the strength by the thickness to show that on a per-unit thickness basis, the membranes of the current invention were stronger than a conventional ICM.

TABLE 7

| Example | Thickness (μm) | Puncture Strength peak load (grams) | Normalized Puncture Strength (gms/μm) |
| --- | --- | --- | --- |
| 20 | 17.8 | 16.9 | 0.95 |
| 21 | 17.8 | 15.9 | 0.89 |
| 22 | 15.2 | 12.9 | 0.85 |
| 23 | 20.3 | 16.7 | 0.82 |
| 24 | 12.7 | 13.1 | 1.03 |
| Control 2 | 30.5 | 16.9 | 0.55 |
| Control 3 | 30.5 | 15.9 | 0.52 |
| Control 4 | 26.5 | 12.9 | 0.49 |
| Control 5 | 31.8 | 16.7 | 0.53 |
| Control 6 | 26.2 | 13.2 | 0.50 |

The overall puncture performance was comparable to conventional dense polymer electrolyte PEMs, even though the composite PVDF proton exchange membranes had thicknesses less than that of the dense membranes. The microporous PVDF films of the present invention were successfully imbibed to function as PEMs in MEAs.

Although the present invention has been described with reference to preferred embodiments, workers skilled in the art will recognize that changes may be made in form and detail without departing from the spirit and scope of the invention.

All patents, applications, and publications mentioned herein are incorporated herein by reference.

We claim:

1. An ion conductive membrane composite comprising:
   a) a shaped article in the form of a network of interconnected micropores, the shaped article comprising: polyvinylidene fluoride or copolymers thereof,
      a sufficient quantity of nucleating agent to initiate crystallization of the polyvinylidene fluoride or copolymers thereof at a significantly greater number of crystallization sites as compared to crystallization without the nucleating agent, and
      wherein the shaped article has been oriented in at least one direction at a stretch ratio of at least approximately 1.1 to 1.0 to provide a network of micropores wherein the micropore size is greater than approximately 0.4 micron, and the shaped article has a thickness less than approximately 1.5 mils and a Gurley less than approximately 10 sec/50 cc; and
   b) a sufficient quantity of ionomer electrolyte filling at least 95% of the pore volume of the micropores of the shaped article to allow the membrane composite to function as an ion conductive membrane.

2. An ion conductive membrane composite of claim 1, wherein the sufficient quantity of nucleating agent is between approximately 0.1 percent to approximately 1.0 percent by weight of polyvinylidene fluoride or copolymers thereof.

3. An ion conductive membrane composite of claim 2 wherein the nucleating agent is selected from the group consisting of Pigment Blue 60, Pigment Red 179, Pigment Violet 5:1, Vat Yellow 2, Pigment Yellow 24, and polytetrafluoroethylene.

4. An ion conductive membrane composite of claim 1, wherein the polyvinylidene fluoride or copolymers thereof are semicrystalline and have melt flow indices between approximately 0.13 g/10 min to approximately 6.0 g/10 min.

5. An ion conductive membrane composite of claim 1, wherein the shaped article is biaxially oriented at a stretch ratio of 1.1 to 1.0.

6. A membrane electrode assembly comprising the ion conductive membrane composite of claim 1.

7. An electrochemical device comprising the membrane electrode assembly of claim 6.

8. A fuel cell comprising the membrane electrode assembly of claim 6.

9. An ion conductive membrane composite of claim 1, wherein the ionomer electrolyte comprises a sulfonated fluoropolymer ionomer.

10. An ion conductive membrane composite of claim 1, wherein the ionomer electrolyte is imbibed into the micropores using a dispersion of the ionomer electrolyte with particles of approximately 260 Å.

11. An ion conductive membrane composite of claim 1, wherein the nucleating agent is nanometer-sized.

12. An ion conductive membrane composite of claim 11, wherein the nanometer-sized nucleating agent comprises polytetrafluoroethylene.

13. An ion conductive membrane composite of claim 11, wherein the sufficient quantity of nucleating agent is between approximately 0.2 percent to approximately 2.5 percent by weight of polyvinylidene fluoride or copolymers thereof.

14. An ion conductive membrane composite of claim 13, wherein the shaped article further comprises glyceryl triacetate.

15. An ion conductive membrane composite of claim 1, wherein the shaped article further comprises glyceryl triacetate.

16. An ion conductive membrane composite of claim 15, wherein the sufficient quantity of nucleating agent is between approximately 0.1 percent to approximately 1.0 percent by weight of polyvinylidene fluoride or copolymers thereof and glyceryl triacetate.

17. An ion conductive membrane composite comprising:
   a) a shaped article in the form of a network of interconnected micropores, the shaped article comprising:
      polyvinylidene fluoride or copolymers thereof, and approximately 0.2 percent to approximately 2.5 percent by weight of nucleating agent based on the amount of the polyvinylidene fluoride or copolymers thereof,
      wherein the shaped article has been oriented in at least one direction at a stretch ratio of at least approximately 1.1 to 1.0 to provide a network of micropores wherein the micropore size is greater than approximately 0.4 micron, and the shaped article has a thickness less than approximately 1.5 mils and a Gurley less than approximately 10 sec/50 cc; and
   b) a volume of ionomer electrolyte sufficient to fill at least 95% of the pore volume of the shaped article and form an ion conductive membrane composite.

18. An ion conductive membrane composite of claim 17, wherein the ionomer electrolyte comprises a sulfonated fluoropolymer ionomer.

19. An ion conductive membrane composite of claim 17, wherein the nucleating agent is nanometer-sized.

20. A membrane electrode assembly comprising the ion conductive membrane composite of claim 17.

21. An electrochemical device comprising the membrane electrode assembly of claim 20.

22. A fuel cell comprising the membrane electrode assembly of claim 20.

23. An ion conductive membrane composite of claim 17, which is a proton exchange membrane composite.

24. An ion conductive membrane composite of claim 1, which is a proton exchange membrane composite.

25. An ion conductive membrane composite comprising:
   a) a shaped article in the form of a network of interconnected micropores, wherein:
      the shaped article comprises polyvinylidene fluoride or copolymers thereof;
      the micropore size is greater than approximately 0.4 micron; and
      the shaped article has a thickness less than approximately 1.5 mils and a Gurley less than approximately 10 sec/50 cc; and
   b) a sufficient quantity of ionomer electrolyte filling at least 95% of the pore volume of the micropores of the shaped article to allow the membrane composite to function as an ion conductive membrane.

26. An ion conductive membrane composite of claim 25, wherein the polyvinylidene fluoride or copolymers thereof are semicrystalline and have melt flow indices between approximately 0.13 g/10 min to approximately 6.0 g/10 min.

27. An ion conductive membrane composite of claim 25, wherein the shaped article is biaxially oriented at a stretch ratio of 1.1 to 1.0.

28. A membrane electrode assembly comprising the ion conductive membrane composite of claim 25.

29. An electrochemical device comprising the membrane electrode assembly of claim 28.

30. A fuel cell comprising the membrane electrode assembly of claim 28.

31. An ion conductive membrane composite of claim 25, wherein the ionomer electrolyte comprises a sulfonated fluoropolymer ionomer.

* * * * *

UNITED STATES PATENT AND TRADEMARK OFFICE
CERTIFICATE OF CORRECTION

PATENT NO. : 8,663,868 B2
APPLICATION NO. : 12/014435
DATED : March 4, 2014
INVENTOR(S) : Samantha Smith et al.

It is certified that error appears in the above-identified patent and that said Letters Patent is hereby corrected as shown below:

In the Specification

Column 14
Line 46, delete "places" and insert -- placed --, therefor.

Signed and Sealed this
Twenty-fourth Day of June, 2014

Michelle K. Lee
*Deputy Director of the United States Patent and Trademark Office*